(12) United States Patent
Koyano et al.

(10) Patent No.: US 7,980,633 B2
(45) Date of Patent: Jul. 19, 2011

(54) SEAT FOR VEHICLE AND SEAT FOR WATERCRAFT

(75) Inventors: Mitsue Koyano, Saitama (JP); Tsutomu Takeuchi, Saitama (JP); Takeshi Ohara, Saitama (JP); Takashi Sunaga, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 881 days.

(21) Appl. No.: 11/605,364

(22) Filed: Nov. 29, 2006

(65) Prior Publication Data

US 2007/0120412 A1 May 31, 2007

(30) Foreign Application Priority Data

Nov. 30, 2005 (JP) ................... 2005-346477
Oct. 30, 2006 (JP) ................... 2006-293758

(51) Int. Cl.
*A47C 7/02* (2006.01)

(52) U.S. Cl. ............ 297/452.27; 297/195.11; 297/214; 297/215.13

(58) Field of Classification Search ............ 297/452.27, 297/195.1, 215.13, 215.16, 195.11, 214
See application file for complete search history.

(56) References Cited

U.S. PATENT DOCUMENTS

| 4,098,537 | A  | * | 7/1978  | Jacobs .............. 297/215.16 X |
| 4,611,851 | A  |   | 9/1986  | Noyes et al. |
| 5,108,076 | A  | * | 4/1992  | Chiarella .............. 297/452.27 |
| 5,833,320 | A  | * | 11/1998 | Kaneko et al. .......... 297/452.27 |
| 5,904,396 | A  |   | 5/1999  | Yates |
| 6,302,488 | B1 | * | 10/2001 | Tanigaki et al. ........ 297/452.27 |
| 6,899,389 | B2 | * | 5/2005  | Saccucci .............. 297/195.1 X |
| 7,159,936 | B2 | * | 1/2007  | Bigolin .............. 297/214 X |
| 7,367,619 | B2 | * | 5/2008  | Fregonese et al. ..... 297/195.1 X |

FOREIGN PATENT DOCUMENTS

| EP | 0 713 900 A1 | 5/1996 |
| EP | 1 093 997 A2 | 4/2001 |
| JP | 10-295498 A  | 11/1998 |

* cited by examiner

*Primary Examiner* — Anthony D Barfield
(74) *Attorney, Agent, or Firm* — Birch, Stewart, Kolasch & Birch, LLP (57) ABSTRACT

A seat for a vehicle and a seat for a watercraft include a polyurethane-made first cushion body covered with a seat skin. A thermoplastic elastomer-made second cushion body is disposed between the first cushion body and a bottom plate 43. The relationships of t1<t2, 5 mm≦t1≦30 mm, and 20 mm≦t2≦50 mm are established, where t1 is the material thickness of the first cushion body, and t2 is the material thickness of the second cushion body. The resulting configuration provides a seat for a vehicle and a seat for watercraft which are capable of securing a good ride comfort.

20 Claims, 7 Drawing Sheets

|  | Material thickness of first cushion body t1 (mm) | Material thickness of second cushion body t2 (mm) |
|---|---|---|
| Material | Polyurethane | Net-like thermoplastic elastomer |
| Seat 1(Comp.Ex.) | 2.5 | 15 |
| Seat 2(Comp.Ex.) | 2.5 | 20 |
| Seat 3(Comp.Ex.) | 2.5 | 50 |
| Seat 4(Comp.Ex.) | 2.5 | 60 |
| Seat 5(Comp.Ex.) | 5 | 15 |
| Seat 6(Example) | 5 | 20 |
| Seat 7(Example) | 5 | 50 |
| Seat 8(Comp.Ex.) | 5 | 60 |
| Seat 9(Example) | 20 | 20 |
| Seat 10(Example) | 20 | 50 |
| Seat 11(Comp.Ex.) | 20 | 60 |
| Seat 12(Example) | 30 | 50 |
| Seat 13(Comp.Ex.) | 30 | 60 |
| Seat 14(Comp.Ex.) | 40 | 50 |
| Seat 15(Comp.Ex.) | 40 | 60 |

|  | Material thickness of first cushion body t1 (mm) | Material thickness of second cushion body t2 (mm) |
|---|---|---|
| Material | Polyurethane | Net-like thermo-plastic elastomer |
| Seat 21(Example) | 50 | 100 |
| Seat 22(Example) | 40 | 110 |
| Seat 23(Example) | 30 | 120 |
| Seat 24(Comp.Ex.) | 20 | 130 |
| Seat 25(Comp.Ex.) | 20 | 110 |
| Seat 26(Example) | 40 | 80 |
| Seat 27(Example) | 30 | 80 |
| Seat 28(Example) | 30 | 60 |
| Seat 29(Comp.Ex.) | 20 | 60 |
| Seat 30(Comp.Ex.) | 30 | 40 |
| Seat 31(Comp.Ex.) | 10 | 60 |
| Seat 32(Example) | 30 | 50 |
| Seat 33(Comp.Ex.) | 20 | 50 |

SEAT FOR VEHICLE AND SEAT FOR WATERCRAFT

CROSS-REFERENCE TO RELATED APPLICATION

The present application claims priority under 35 U.S.C. §119 to Japanese Patent Application No. 2006-293758, filed Oct. 30, 2006, and Japanese Patent Application No. 2005-346477, filed Nov. 30, 2005, the entire contents of which are hereby incorporated by reference.

BACKGROUND OF THE INVENTION

1. Field of the Invention

The present invention relates to a seat for a vehicle and a seat for watercraft, particularly to a seat for a vehicle and a seat for watercraft wherein a polyurethane and a thermoplastic elastomer are used for cushion bodies covered with a seat skin.

2. Description of Background Art

As an example of a seat for a vehicle, there has been proposed a seat for a vehicle wherein a predetermined space defined by a first cushion body, such as a polyurethane foam, provided adjacent to and on the inside of a seat skin and an armor member composed of a bottom plate is charged with a lump-form thermoplastic elastomer-made second cushion body so as to leave a gap at the outer periphery of a side surface portion, thereby contriving enhancement of the ride comfort of the seat (refer to, for example, Japanese Patent Laid-Open No. Hei 10-295498).

However, in the seat for a vehicle as described in Japanese Patent Laid-Open No. Hei 10-295498, it is only shown that members differing in properties are used for the cushion bodies used in the inside of the seat, and such a mere combination may rather worsen the ride comfort. In addition, the predetermined space defined by the first cushion body and the armor member composed of the bottom plate is charged with the second cushion body so as to leave a gap; therefore, for example, a corner portion between the upper surface and a side surface of the thermoplastic elastomer-made second cushion body may be sensed as a hard edge upon seating, or a hardness of some region of the seat different from the hardness of the surrounding regions may be sensed as a foreign matter during running, whereby the ride comfort may be worsened.

The reason for the worsening of the ride comfort is considered as follows. At the time of absorbing vibrations or shocks transmitted from a road surface or the like or at the time of dispersing the driver's weight, the load absorption characteristic and/or propagation characteristic may become discontinuous at the boundary portion between the polyurethane-made first cushion body and the thermoplastic elastomer-made second cushion body, and a portion where the vibration absorption performance or the load dispersion performance is spoiled may be locally generated.

SUMMARY AND OBJECTS OF THE INVENTION

The present invention has been made in consideration of the above-mentioned circumstances. Accordingly, it is an object of the present invention to provide a seat for a vehicle and a seat for watercraft which are capable of securing a good ride comfort.

In order to attain the above object, according to a first aspect of the present invention, a seat for a vehicle includes a polyurethane-made first cushion body covered with a seat skin, and a thermoplastic elastomer-made second cushion body disposed between said first cushion body and a bottom plate. The relationships of $t1<t2$, $5\text{ mm}\leq t1 \leq 30\text{ mm}$, and $20\text{ mm} \leq t2 \leq 50\text{ mm}$ are established, where $t1$ is the material thickness of the first cushion body, and $t2$ is the material thickness of the second cushion body.

According to a second aspect of the present application, the second cushion body has arcuate side surfaces extending from an upper surface toward the outer sides in the width direction, and the first cushion body makes surface contact with the upper surface and the side surfaces of the second cushion body and extends toward the bottom plate.

According to a third aspect of the present invention, the second cushion body is formed in a shape such that the material thickness of an outer peripheral edge portion thereof is gradually reduced toward the outside.

According to a fourth aspect of the present invention, a seat for a watercraft includes a polyurethane-made first cushion body covered with a seat skin, and a thermoplastic elastomer-made second cushion body disposed between the first cushion body and a bottom plate. The relationships of $t1<t2$, $30\text{ mm}\leq t1 \leq 50\text{ mm}$, and $50\text{ mm} \leq t2 \leq 120\text{ mm}$ are established, where $t1$ is the material thickness of the first cushion body, and $t2$ is the material thickness of the second cushion body.

EFFECTS OF THE INVENTION

According to the first aspect of the present invention, the relationships of $t1<t2$, $5\text{ mm}\leq t1 \leq 30\text{ mm}$, and $20\text{ mm} \leq t2 \leq 50\text{ mm}$ are established, where $t1$ is the material thickness of the first cushion body, and $t2$ is the material thickness of the second cushion body. Therefore, a good ride comfort can be secured evenly over substantially the whole region of the seat surface.

According to the second aspect of the invention, the second cushion body has arcuate side surfaces extending from an upper surface toward the outer sides in the width direction, and the first cushion body makes surface contact with the upper surface and the side surfaces of the second cushion body and extends toward the bottom plate. Therefore, the first cushion body and the second cushion body make surface contact smoothly and over a broad area. Accordingly, a portion where vibration absorption performance and/or load dispersion performance is spoiled would not be locally generated, and a good ride comfort can be secured evenly over substantially the whole region of the seat surface.

According to the third aspect of the present invention, the second cushion body is formed in a shape such that the material thickness of an outer peripheral edge portion thereof is gradually reduced toward the outside. Therefore, the load absorption characteristic and/or propagation characteristic can be prevented from becoming discontinuous at the boundary portion between the polyurethane-made first cushion body and the thermoplastic elastomer-made second cushion body. Accordingly, the ride comfort can be prevented from being lowered due to a sharp change in cushion performance or the like at the boundary portion.

According to the fourth aspect of the present invention, the relationships of $t1<t2$, $30\text{ mm}\leq t1 \leq 50\text{ mm}$, and $50\text{ mm} \leq t2 \leq 120\text{ mm}$ are established, where $t1$ is the material thickness of the first cushion body, and $t2$ is the material thickness of the second cushion body. Therefore, a good ride comfort can be secured evenly over substantially the whole region of the seat surface.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
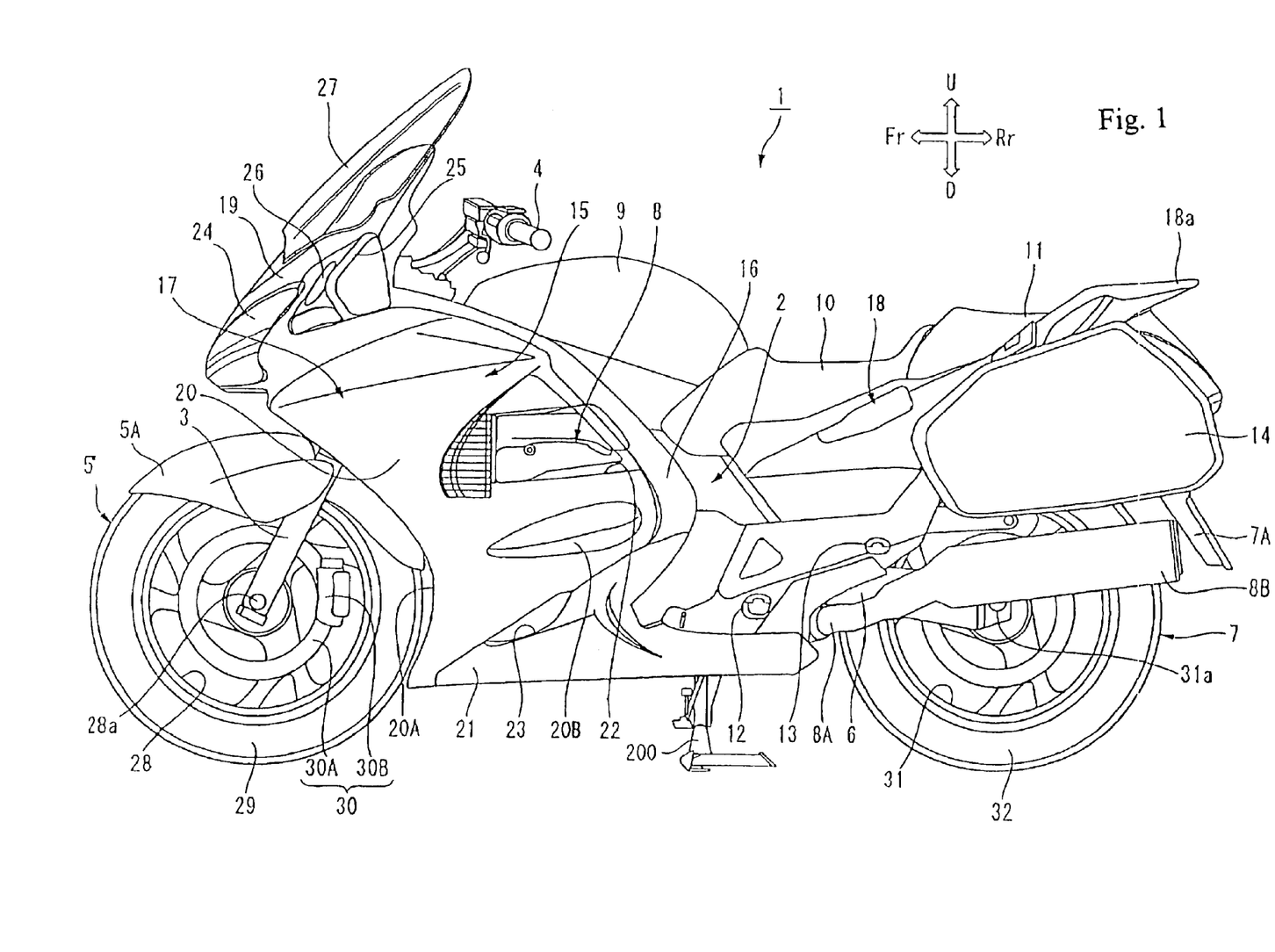
FIG. 1 is a general schematic side view of a motorcycle on which the seat for a vehicle according to the present invention is mounted.
Figure 2:
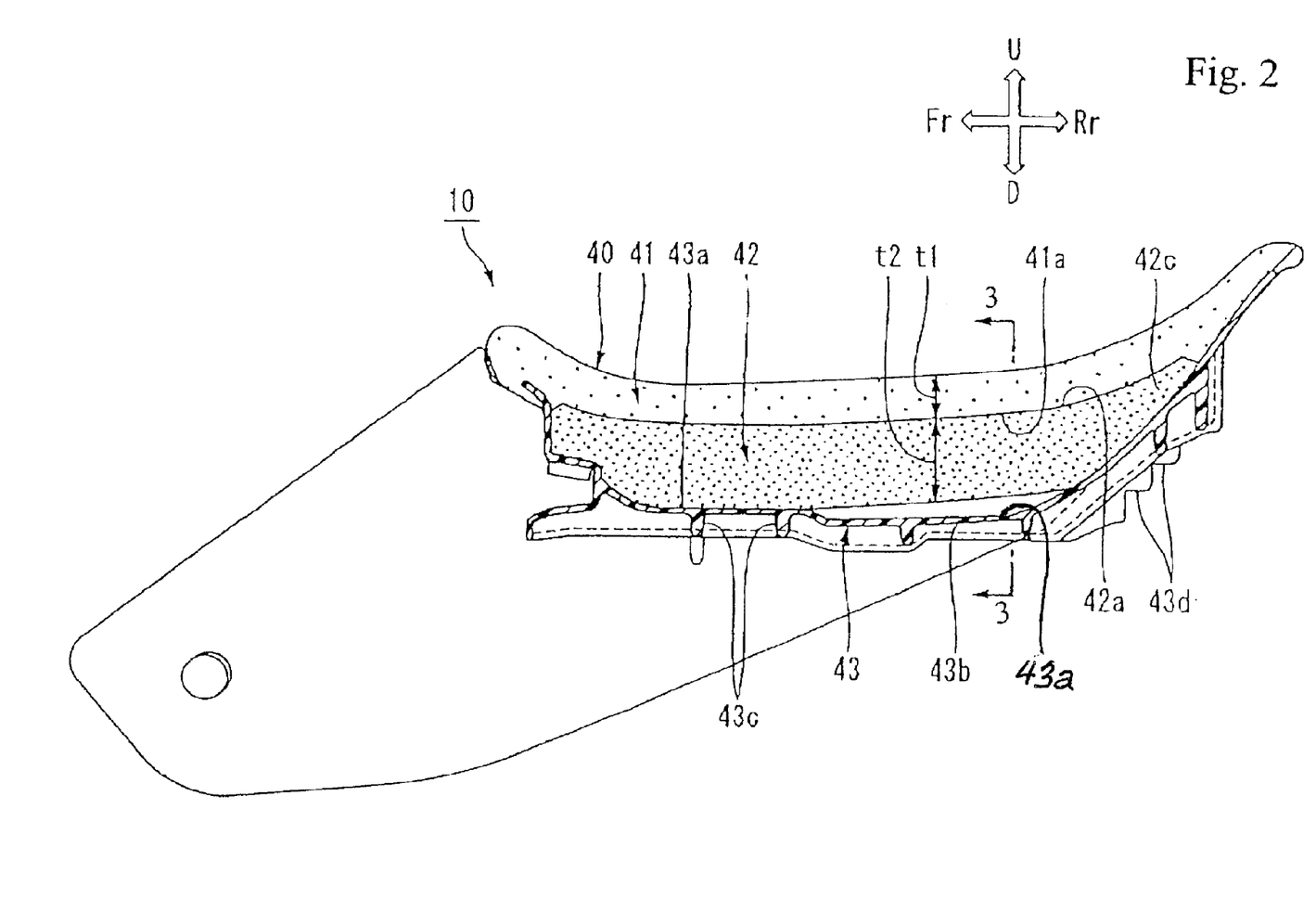
FIG. 2 is an enlarged vertical sectional view of the seat for a vehicle in the motorcycle shown in FIG. 1.
Figure 3:
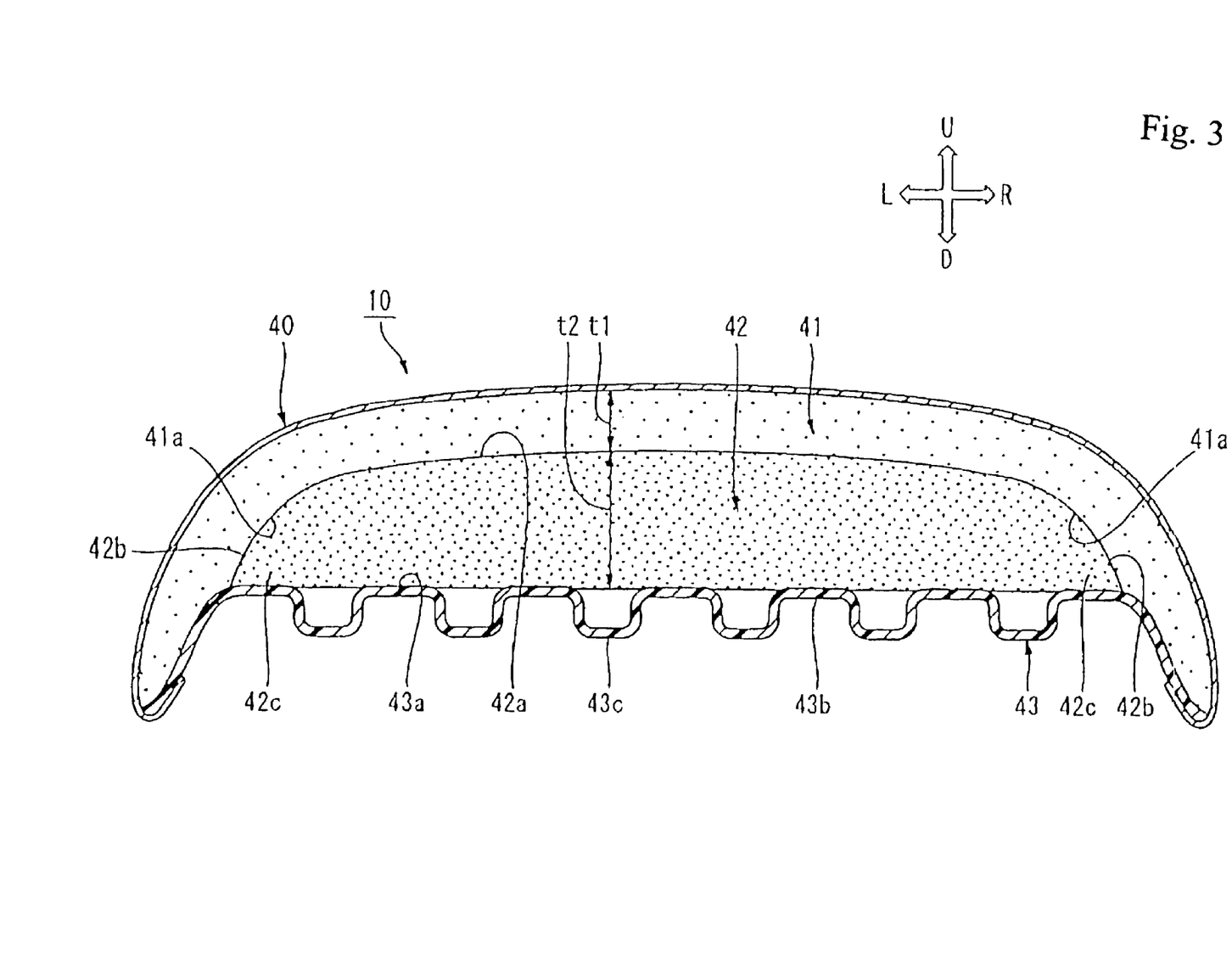
FIG. 3 is a sectional view taken along arrows of line 3-3 of FIG. 2.

FIGS. 1 to 3 show an embodiment of the seat for a vehicle according to the present invention, in which FIG. 1 is a general schematic side view of a motorcycle on which a seat for a vehicle according to the present invention is mounted, FIG. 2 is an enlarged vertical sectional view of the seat for a vehicle in the motorcycle shown in FIG. 1, and FIG. 3 is a sectional view taken along arrows of line 3-3 of FIG. 2. Incidentally, in the following description, the front and rear sides, the left and right sides, and the upper and lower sides refer to those sides as viewed from the driver, and the front side will be denoted as Fr, the rear side as Rr, the left side as L, the right side as R, the upper side as U, and the lower side as D.

In FIG. 1, the motorcycle 1 comprises a vehicle body frame 2, a left-right pair form front fork 3 turnably supported on a front end portion of the vehicle body frame 2, a steering handle 4 attached to an upper end portion of the front fork 3, a front wheel 5 rotatably supported on the upper side of the front fork 3, a rear fork (swing arm) 6 swingably supported on the vehicle body frame 2, a rear wheel 7 rotatably supported on rear end portions of the rear fork 6, an engine 8 supported on the vehicle body frame 2, a fuel tank 9 disposed at an upper portion of the vehicle body frame 2, a driver's seat (seat for vehicle) 10 provided on the rear side of the fuel tank 9 to seat the driver thereon, a passenger's seat (seat for vehicle) 11 provided on the driver's seat to seat the passenger thereon, driver's steps 12, passenger's steps 13, side trunks 14 attached to the left and right of a vehicle body rear portion, and a cowling 15 covering substantially the whole of the vehicle body. Incidentally, FIG. 1 shows the motorcycle 1 in the state of being supported by a stand 200.

Exhaust pipes 8A are connected to a cylinder portion of the engine 8. Each of the exhaust pipes 8A extends downwards, is then bent on the lower side of the engine 8, and is connected to a muffler 8B disposed on the rear side thereof.

The cowling 15 includes a front cowl 17 covering a vehicle body front portion and having an upper end surface set along a main frame 16 of the vehicle body frame 2, and a rear cowl 18 covering a vehicle body rear portion which is a portion under the seats 10, 11. Furthermore, the front cowl 17 includes an upper cowl 19 provided at the front end of the vehicle body, a middle cowl 20 covering side portions of the engine 8, and an under cowl 21 covering a lower portion of the engine 8 (lower portions of the exhaust pipes 8A).

Of the front cowl 17, a central portion in the height direction is provided with a first opening portion 22, and a lower portion is provided with a second opening portion 23. Air (running airflow) goes into and out of the inside of the cowling through the first opening portion 22 and the second opening portion 23. A head cover of the engine 8 is exposed through the first opening portion 22. In addition, the front cowl 17 is provided, on the front side of the middle cowl 20, with a running airflow intake port 20A for taking the running airflow into the inside of the cowling, and bulging panels 20B bulging to the vehicle body outside are provided at the left and right of a lower portion of the middle cowl 20.

A meter unit (not shown) fitted with a speedometer, an engine speed meter and the like is disposed on the inside of the upper cowl 19. Besides, as shown in FIG. 1, a headlamp 24 is provided on a front surface of the upper cowl 19, and rearview mirror covers 25 are bulgingly provided on both side surfaces of the upper cowl 19. Rearview mirrors are provided inside the rearview mirror covers 25. The rearview mirror cover 25 is attached to the front cowl 17 by engaging a recessed form lock portion provided on a side surface of the front cowl 17 with a projected portion possessed by the rearview mirror cover 25. In addition, direction indicators 26 are provided on respective front surfaces of the rearview mirror covers 25. A transparent synthetic resin-made windscreen 27 for front visual field is provided at an upper portion of the upper cowl 19.

The upper cowl 19 is provided with an appropriate number of ducts (not shown) for guiding the running airflow to the cowl rear side, and the running airflow guided through the ducts to the cowl rear side restrains a negative pressure from being generated in the space between the upper cowl 19 and the windscreen 27 and the driver.

The rear cowl 18 is formed in the range from the lower side to the rear side of the seats 10, 11, and a rear portion thereof is integrally provided with a tail portion 18a for covering a rear portion of the seat 11. A rear fender 7A covering an upper rear portion of the rear wheel 7 is attached to the rear end of the rear cowl 18.

A front wheel 5 has a tire 20 attached to the outer circumference of a wheel 28 provided with an axle 28a at an axis thereof, and both left and right sides of the axle 28a are supported by lower end portions of the front fork 3. Incidentally, a front fender 5A covering the upper side of the front wheel 5 is attached to the left-right pair form front fork 3. Rotors 30A constituting a front disk brake system 30 are fixed to both left and right sides of the wheel 28 of the front wheel 5, coaxially and integrally with the wheel 28. The front disk brake system 30 has the rotors 30A and brake calipers 30b for clamping the rotors 30A in their operating condition to thereby brake the rotation through frictional forces.

Like the front wheel 5, the rear wheel 7 has a wheel 31 provided with an axle 31a at an axis thereof and a tire 32 attached to the outer circumference of the wheel 31. The axle 31a is supported on the rear ends of the rear fork 6 in a cantilever form, whereby it is swung as one body with the rear fork 6. The rear wheel 7 also is provided with a rear disk brake system composed of rotors and brake calipers in the same manner as the front disk brake system 30 for the front wheel 5, but description of the rear disk brake system is omitted here.

As shown in FIGS. 2 and 3, the driver's seat 10 has a polyurethane-made first cushion body 41 covered with a seat skin 40, and a thermoplastic elastomer-made second cushion body 42 disposed between the first cushion body 41 and a bottom plate 43.

The bottom plate 43 functions as a strength member supporting the first cushion body 41 and the second cushion body 42 and maintaining the strength of the seat as a whole, and functions also as a mechanism member for joining the driver's seat 10 to a seat frame (not shown) extending from an upper portion of the main frame 16 toward the vehicle body rear side. The bottom plate 43 is formed in a predetermined shape from a resin material, a metal plate or the like having a high mechanical strength.

In addition, of the bottom plate 43, the inside surface 43*a* on the second cushion body 42 side is formed as a smooth flat surface or curved surface provided with no projecting rib, whereas the outside surface 43*b* on the seat frame side is provided with reinforcement ribs 43*c* for enhancing the flexural rigidity of the bottom plate 43, at appropriate intervals.

Besides, on the rear end side of the bottom plate 43, step portions 43*d* for engagement with a lock mechanism (not shown) provided on the seat frame side are provided in a plurality of stages in a stairway-like form; by changing the position of engagement of the step portions 43*d* with the lock mechanism on the seat frame side, the seat surface position of the driver's seat 10 (seat height) can be adjusted in a plurality of stages.

In the case of this embodiment, the first cushion body 41 and the second cushion body 42 are set substantially constant in material thickness in other regions than an outer peripheral edge portion thereof, and the relationships of t1<t2, 5 mm≦t1≦30 mm, and 20 mm≦t2≦50 mm are established, where t1 is the material thickness of the first cushion body in other regions than the outer peripheral edge portion, and t2 is the material thickness of the second cushion body in other regions than the outer peripheral edge portion.

In addition, as shown in FIG. 3, the second cushion body 42 has arcuate side surfaces 42*b* extending from an upper surface 42*a* toward the outer sides in the width direction, and the inside surface 41*a* of the first cushion body 41 makes surface contact with the upper surface 42*a* and the side surfaces 42*b* of the second cushion body 42 and extends toward the bottom plate 43. Incidentally, it suffices the curvature of arc of the arcuate side surfaces 42*b* is arbitrary, inasmuch as the inside surface 41*a* of the first cushion body 41 and the upper surface 42*a* and the side surfaces 42*b* of the second cushion body 42 make surface contact smoothly and over a broad area.

Besides, the second cushion body 42 formed in a shape such that the material thickness of an outer peripheral edge portion (inclusive of the side surfaces 42*b* shown) 42*c* is gradually reduced toward the outside. Incidentally, in this embodiment, a front end portion of the outer peripheral edge portion 42*c* of the second cushion body 42 is not so shaped that the material thickness thereof is gradually reduced toward the outside, but it may be so shaped that the material thickness thereof is gradually reduced toward the outside.

Furthermore, the second cushion body 42 is not a solid lump form thermoplastic elastomer but is a net-like thermoplastic elastomer in which filamentous members of a thermoplastic elastomer of an isotropic gelled visco-elastic body type are bound in a three-dimensional net-like form.

In a specific process of producing the second cushion body 42, first, the filamentous members of the thermoplastic elastomer of an isotropic gelled visco-elastic body type are jetted through a multiplicity of nozzles of an extruder. A bundle of a multiplicity of the filamentous members of the thermoplastic elastomer jetted from the multiplicity of the nozzles is passed through a cooling tank at a predetermined temperature, whereby the filamentous members are partly fused to each other, to form a rod-like body of a net-like thermoplastic elastomer in which the filamentous members are bound in a three-dimensional net-like form. Then, the rod-like body of the net-like thermoplastic elastomer is cut to a block-like parent material having a size necessary for the driver's seat 10. The parent material is placed in a thermoforming die having a cavity conforming to the shape of the second cushion body 42, and thermoforming is conducted at a predetermined temperature and a predetermined pressure, whereby the second cushion body 42 with a predetermined shape is completed.

When a compressive load is exerted on the second cushion body 42 thus formed, the filamentous members of the thermoplastic elastomer themselves are not changed in volume under compression, and they tend to deform in the directions perpendicular to the compression direction in amounts corresponding to the collapse in the compression direction, but such a deformation is absorbed by the voids in the network structure. Therefore, the deformation would not range to the outside of the second cushion body 42. Accordingly, the second cushion body 42 can be layered in the state of close contact, without any gap, with the first cushion body 41, whereby it is possible to contrive enhancement of the ride comfort.

Here, the good ride comfort means appropriate degrees of sensation of fitness and sensation of hardness. The presence of the sensation of fitness means that, when the rider is seated on the vehicle seat (seat for vehicle) 10, the contact area between the rider and the seat is large, and the surface pressure change is little. The presence of the sensation of hardness means that, when the rider is seated on the vehicle seat 10, the rider feels the hardness of the seat; the ride comfort is poor if the seat is felt too hard or too soft.

In addition, in the case of a motorcycle, when the total material thickness (t1+t2) of the first and second cushion bodies 41, 42 exceeds 80 mm, the ride comfort is enhanced, but the material thickness of the seat is too large and the seating position is too high, leading to a poor foot grounding property. Therefore, the total material thickness of the first and second cushion bodies 41, 42 is preferably not more than 80 mm.

In addition, in the case of the seat for a watercraft which is mounted on a saddle ride type watercraft, both the first cushion body 41 and the second cushion body 42 are set substantially constant in material thickness in other regions than their outer peripheral edge portions, and the relationships of t1<t2, 30 mm≦t1≦50 mm, and 50 mm≦t2≦120 mm are established, where t1 is the material thickness of the first cushion body 41 in other regions than its outer peripheral edge portion, and t2 is the material thickness of the second cushion body 42 in other regions than its outer peripheral edge portion. Incidentally, the configuration of the seat for watercraft used for a saddle ride type watercraft is the same as that of the driver's seat 10 for the motorcycle 1 described above, except for the ranges set in regard of the material thicknesses t1 and t2 of the first and second cushion bodies 41 and 42.

In addition, in the case of the watercraft seat for a saddle ride type watercraft, unlike in the case of the above-described motorcycle, it is unnecessary to take the foot grounding property into account. Therefore, the total material thickness (t1+ t2) of the first and second cushion bodies 41 and 42 may be set to be greater than 80 mm. In addition, if the total material thickness of the first and second cushion bodies 41 and 42 exceeds 150 mm, the total material thickness of the seat is too large, though a good ride comfort can be secured. Therefore, the total material thickness of the first and second cushion bodies 41 and 42 is preferably not more than 150 mm. Incidentally, the ranges set for the material thicknesses t1 and t2 of the first and second cushion bodies 41 and 42 of the seat for watercraft are applicable also to saddle ride type four-wheel vehicles where it also is unnecessary to take the foot grounding property into account.

As has been described above, according to the vehicle seat 10 in this embodiment, the relationships of t1<t2, 5 mm$\leq$t1$\leq$30 mm, and 20 mm$\leq$t2$\leq$50 mm are established, where t1 is the material thickness of the first cushion body, and t2 is the material thickness of the second cushion body. Therefore, a good ride comfort can be secured evenly over substantially the whole region of the seat surface.

In addition, according to the vehicle seat 10 in this embodiment, the second cushion body 42 has arcuate side surfaces 42b extending from the upper surface 42a toward the outer sides in the width direction, and the first cushion body 41 makes surface contact with the upper surface 42a and the side surfaces 42b of the second cushion body 42 and extends toward the bottom plate 43. Therefore, the first cushion body 41 and the second cushion body 42 make surface contact smoothly and over a broad area, so that a portion where vibration absorption performance and/or load dispersion performance is spoiled would not be locally generated, and a good ride comfort can be secured evenly over substantially the whole region of the seat surface.

Further, according to the vehicle seat 10 in this embodiment, the second cushion body 42 is formed in a shape such that the material thickness of the outer peripheral edge portion thereof is gradually reduced toward the outside. Therefore, it is possible to prevent the load absorption characteristic and/or propagation characteristic from becoming discontinuous at the boundary portion between the polyurethane-made first cushion body 41 and the thermoplastic elastomer-made second cushion body 42. As a result, the ride comfort can be prevented from being lowered due to a sharp change in the cushioning property or the like at the boundary portion.

Still further, according to the vehicle seat 10 in this embodiment, the inside surface 43a of the bottom plate 43 is formed to be a smooth flat surface or curved surface not having any projecting rib. Therefore, it suffices for the contact surface of the second cushion body 42 to also be formed in a simple shape of a flat or curved surface. Accordingly, the formability (or moldability) of the second cushion body 42 can be enhanced.

In addition, according to the watercraft seat in this embodiment, the relationships of t1<t2, 30 mm$\leq$t1$\leq$50 mm, and 50 mm$\leq$t2$\leq$120 mm are established, where t1 is the material thickness of the first cushion body 41, and t2 is the material thickness of the second cushion body 42. Therefore, a good ride comfort can be secured evenly over substantially the whole region of the seat surface.

In addition, according to the watercraft seat in this embodiment, the second cushion body 42 has arcuate side surfaces 42b extending from the upper surface 42a toward the outer sides in the width direction, and the first cushion body 41 makes surface contact with the upper surface 42a and the side surfaces 42b of the second cushion body 42 and extends toward the bottom plate 43. Therefore, the first cushion body 41 and the second cushion body 42 make surface contact smoothly and over a broad area, so that a portion where vibration absorption performance and/or load dispersion performance is spoiled would not be locally generated, and a good ride comfort can be secured evenly over substantially the whole region of the seat surface.

Further, according to the watercraft seat in this embodiment, the second cushion body 42 is formed in a shape such that the material thickness of the outer peripheral edge portion thereof is gradually reduced toward the outside. Therefore, it is possible to prevent the load absorption characteristic and/or propagation characteristic from becoming discontinuous at the boundary portion between the polyurethane-made first cushion body 41 and the thermoplastic elastomer-made second cushion body 42. As a result, the ride comfort can be prevented from being lowered due to a sharp change in the cushioning property or the like at the boundary portion.

Still further, according to the watercraft seat in this embodiment, the inside surface 43a of the bottom plate 43 is formed to be a smooth flat surface or curved surface not having any projecting rib. Therefore, it suffices for the contact surface of the second cushion body 42 to also be formed in a simple shape of a flat or curved surface. Accordingly, the formability (or moldability) of the second cushion body 42 can be enhanced.

Incidentally, while the structure of the driver's seat 10 for the motorcycle 1 has only been described in this embodiment, the passenger's seat 11, like the driver's seat 10, also comprises a polyurethane-made first cushion body 41 covered with a seat skin 40, and a thermoplastic elastomer-made second cushion body 42 disposed between the first cushion body 41 and a bottom plate 43, and is so set that the relationships of t1<t2, 5 mm$\leq$t1$\leq$30 mm, and 20 mm$\leq$t2$\leq$50 mm are established, where t1 is the material thickness of the first cushion body 41, and t2 is the material thickness of the second cushion body 42.

In addition, while the watercraft seat for a saddle ride type watercraft has been described in this embodiment, the ranges set in regard of the material thicknesses t1 and t2 of the first and second cushion bodies 41 and 42 of the watercraft seat are applied to the driver's seat and the passenger's seat which are watercraft seats.

Incidentally, the present invention is not limited to this embodiment, and modifications, improvements and the like can be made in the invention as required.

For example, while the seat for a vehicle according to the present invention is most suited to a seat for a saddle ride type vehicle such as a motorcycle, its application is not limited to this; the present invention may be applied to seats for various vehicles such as passenger cars, industrial vehicles, electric railcars, passenger airplanes, etc.

EXPERIMENT #1

Next, the results of an experiment of the sensation of fitness and the sensation of harness conducted for vehicle seats 10 of the present invention will be described below, referring to FIG. 5. Incidentally, the sensation of fitness and the sensation of hardness were judged according to the rider seated on the seat.

Figure 4:
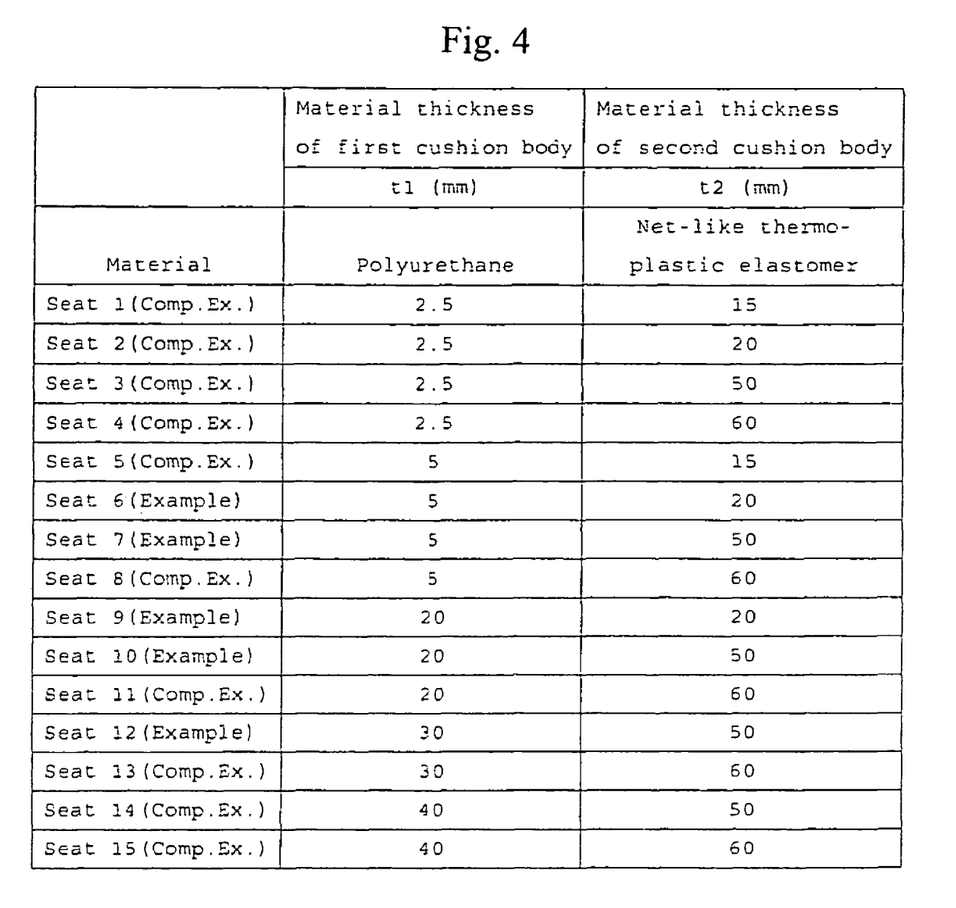
FIG. 4 shows thicknesses of material used for seats 1-15 in Experiment #1.

In this experiment, one each of Seats 1 to 15 changed in the material thickness t1 of the polyurethane-made first cushion body and the material thickness of the net-like thermoplastic elastomer-made second cushion body as shown in FIG. 4 were prepared, and a motorcycle equipped with each of Seats 1 to 15 was made to run with several riders seated on the seat, to numerically evaluate the sensation of fitness and the sensation of hardness of each seat, thereby synthetically evaluating the ride comfort. The results are shown in FIG. 5. Incidentally, the optimum ranges of the sensation of fitness and the sensation of hardness for the ride comfort of the seat are given in Area B of FIG. 5.

Figure 5:
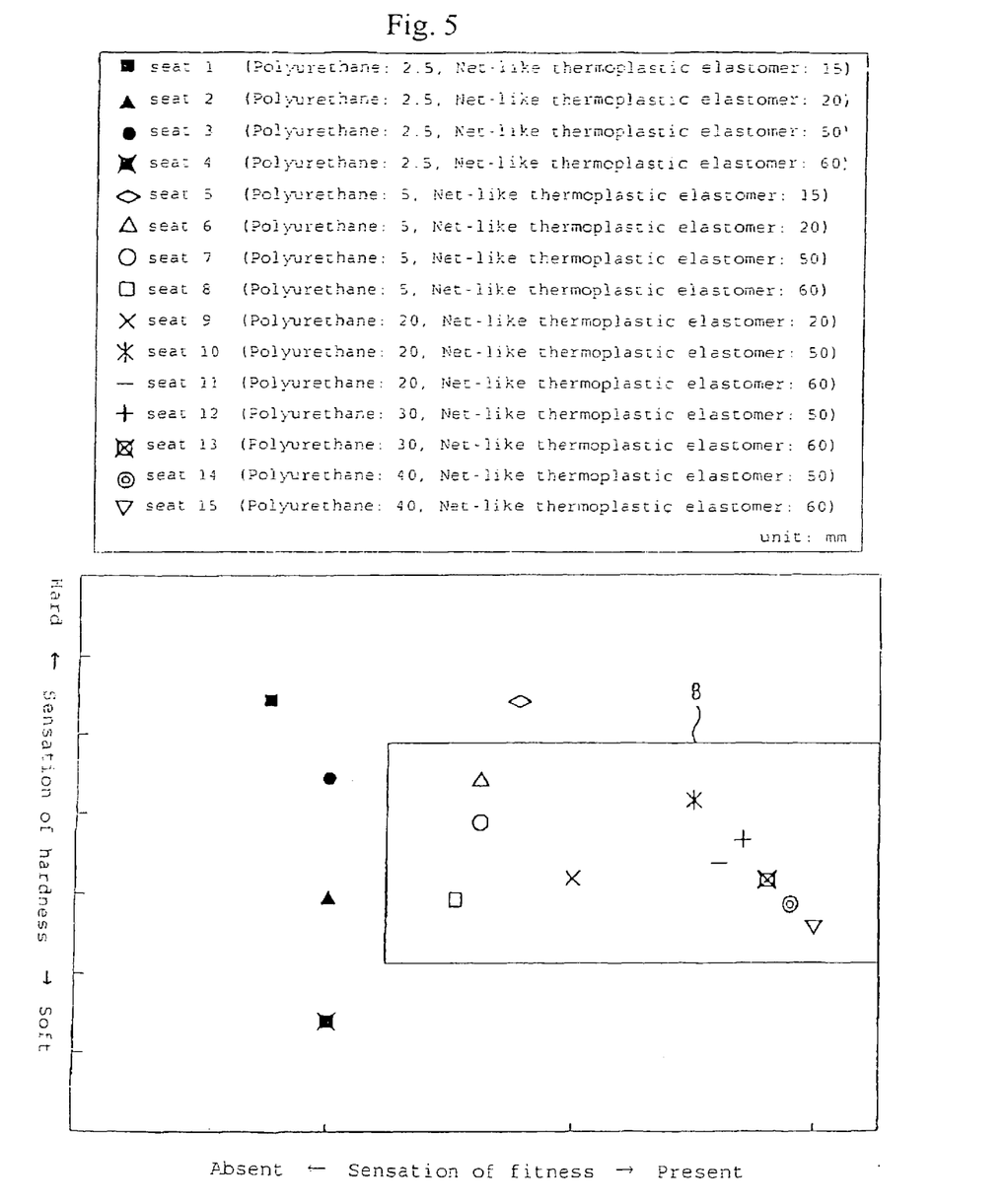
FIG. 5 shows a graph showing the results of the sensation of fitness and the sensation of hardness of seats for vehicle as determined in Experiment #1.

As is clear from FIG. 5, it was found that the seats falling within Area B indicating the optimum ranges of the sensation of fitness and the sensation of hardness are Seats 6 to 15. From this it was revealed that the optimum ranges of the material thickness t1 of the first cushion body and the material thickness t2 of the second cushion body are t1<t2, 5 mm≦t1≦40 mm, and 20 mm≦t2≦60 mm. Besides, in the case of a motorcycle, the total material thickness (t1+t2) of the first and second cushion bodies is preferably not more than 80 mm, from the viewpoint of food grounding property. Thus, it was revealed that the optimum ranges of the material thickness t1 and the material thickness t2 of the second cushion body are t1<t2, 5 mm≦t1≦30 mm, and 20 mm≦t2≦50 mm.

EXPERIMENT #2

Next, the results of an experiment of the sensation of fitness and the sensation of hardness conducted for the watercraft seats of the present invention will be described below, referring to FIG. 7. Incidentally, the sensation of fitness and the sensation of hardness were judged according to the rider seated on the seat.

Figure 6:
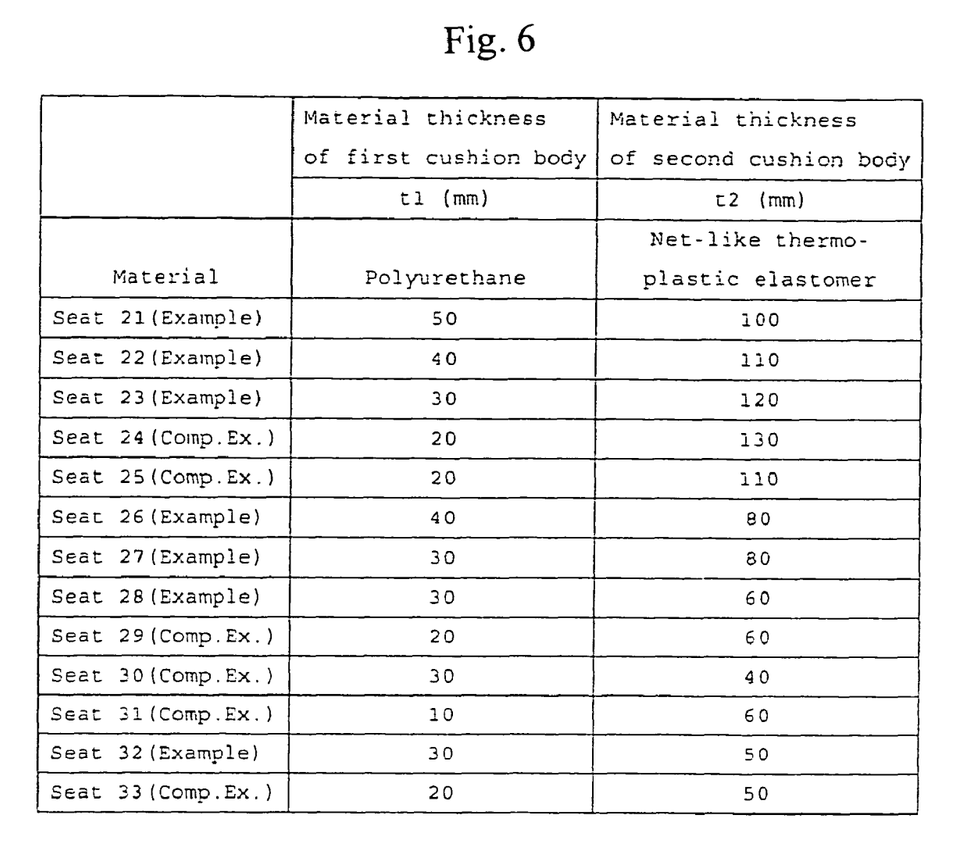
FIG. 6 shows thicknesses of material used for seats 1-15 in Experiment #1.

In this experiment, one each of Seats 21 to 33 changed in the material thickness t1 of the polyurethane-made first cushion body and the material thickness t2 of the net-like thermoplastic elastomer-made second cushion body as shown in FIG. 6 were prepared, and a saddle ride type watercraft equipped with each of Seats 21 to 33 was made to navigate with several riders seated on the seat, to numerically evaluate the sensation of fitness and the sensation of hardness of each seat, thereby synthetically evaluating the ride comfort. The results are shown in FIG. 7. Incidentally, the optimum ranges of the sensation of fitness and the sensation of hardness for the ride comfort of the seat are given in Area C of FIG. 7.

Figure 7:
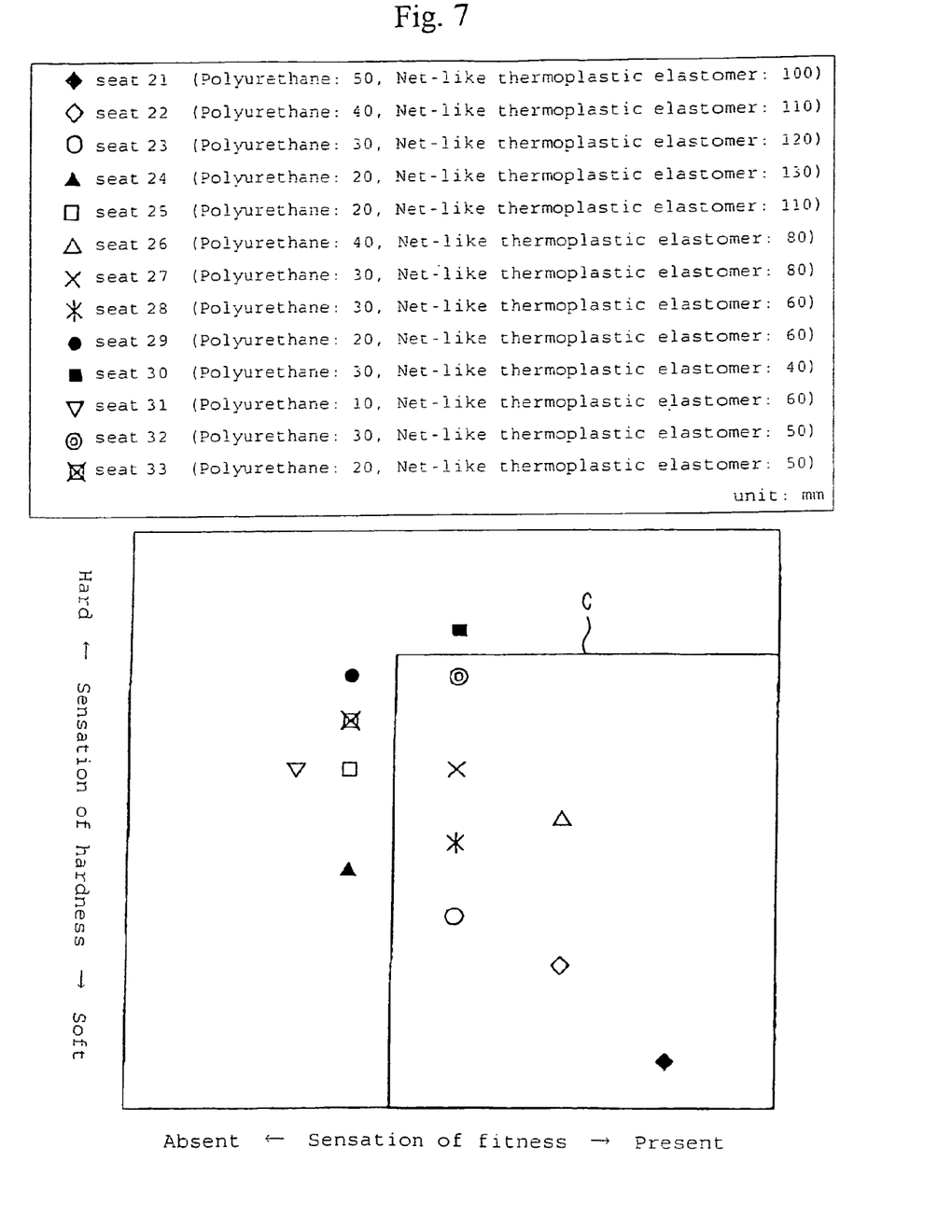
FIG. 7 shows a graph showing the experimental results of the sensation of fitness and the sensation of hardness of seats for watercraft as determined in Experiment #2.

As is clear from FIG. 7, it was found that the seats falling within Area C indicating the optimum ranges of the sensation of fitness and the sensation of hardness are Seats 21 to 23, Seats 26 to 28, and Seat 32. From this it was revealed that the optimum ranges of the material thickness t1 of the first cushion body and the material thickness t2 of the second cushion body are t1<t2, 30 mm≦t1≦50 mm, and 50 mm≦t2≦120 mm.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A seat for a vehicle, comprising a polyurethane-made first cushion body covered with a seat skin, and a thermoplastic elastomer-made second cushion body disposed between said first cushion body and a bottom plate,
   wherein the relationships of t1<t2, 5 mm≦t1≦30 mm, and 20 mm≦t2≦50 mm are established, where t1 is a material thickness of said first cushion body, and t2 is a material thickness of said second cushion body,
   wherein the bottom plate further includes step portions on a rear side of the bottom plate for adjusting a seat height in a plurality of stages, the step portions being arranged as steps of a linear stairway.

2. The seat for a vehicle as set forth in claim 1, wherein said second cushion body has arcuate side surfaces extending from an upper surface toward outer sides in a width direction, and said first cushion body makes surface contact with said upper surface and said side surfaces of said second cushion body and extends toward said bottom plate.

3. The seat for a vehicle as set forth in claim 2, wherein said second cushion body is formed in a shape such that the material thickness of an outer peripheral edge portion thereof is gradually reduced toward the outside.

4. The seat for a vehicle as set forth in claim 1, wherein said second cushion body is formed in a shape such that the material thickness of an outer peripheral edge portion thereof is gradually reduced toward the outside.

5. The seat for a vehicle as set forth in claim 1, wherein the bottom plate is formed in a predetermined shape from a resin material, or a metal plate having a high mechanical strength.

6. The seat for a vehicle as set forth in claim 1, wherein the bottom plate includes an inside surface on a second cushion body side that is formed as a smooth flat surface or curved surface provided with no projecting rib, and an outside surface on a seat frame side is provided with reinforcement ribs for enhancing flexural rigidity of the bottom plate, at appropriate intervals.

7. The seat for a vehicle as set forth in claim 6, wherein the reinforcement ribs are spaced apart at irregular intervals along the outside surface of the bottom plate.

8. The seat for a vehicle as set forth in claim 1, wherein the second cushion body is formed of a thermoplastic elastomer in which filamentous members of the thermoplastic elastomer of an isotropic gelled visco-elastic body are bound in a three-dimensional net form.

9. The seat for a vehicle as set forth in claim 1, further comprising a skin extending over an entire surface of the first cushion body and wrapping around edges of the bottom plate.

10. The seat for a vehicle as set forth in claim 1, wherein length and width dimensions of the bottom plate are greater than length and width dimensions of the second cushion body.

11. A seat for a watercraft, comprising
   a polyurethane-made first cushion body covered with a seat skin, and a thermoplastic elastomer-made second cushion body disposed between said first cushion body and a bottom plate,
   wherein the relationships of t1<t2, 30 mm≦t1≦50 mm, and 50 mm≦t2≦120 mm are established, where t1 is a material thickness of said first cushion body, and t2 is a material thickness of said second cushion body,
   wherein the bottom plate includes an inside surface on a second cushion body side that is formed as a curved surface provided with no projecting rib, and an outside surface on a seat frame side is provided with downwardly-extending reinforcement ribs for enhancing flexural rigidity of the bottom plate, at appropriate intervals, from a central portion of the outside surface,
   wherein a forward most part of the bottom plate projects upwardly above a forward most part of the second cushion body.

12. The seat for a watercraft as set forth in claim 11, wherein said second cushion body has arcuate side surfaces extending from an upper surface toward outer sides in a width direction, and said first cushion body makes surface contact with all of said upper surface and all of said side surfaces of said second cushion body and extends toward said bottom plate.

13. The seat for a watercraft as set forth in claim 11, wherein said second cushion body is formed in a shape such that the material thickness of an outer peripheral edge portion thereof is gradually reduced toward the outside.

14. The seat for a watercraft as set forth in claim 11, wherein a rear most portion of the bottom plate projects upwardly above a rear most portion of the second cushion body.

15. The seat for a watercraft as set forth in claim 11, wherein the bottom plate is formed in a predetermined shape from a resin material, or a metal plate having a high mechanical strength.

16. The seat for a watercraft as set forth in claim 11, wherein a forward-most portion of the first cushion body is arranged at a position that is forward and higher than a forward-most end of the second cushion body.

17. The seat for a watercraft as set forth in claim 11, wherein the bottom plate further includes step portions on a rear side of the bottom plate for adjusting a seat height in a plurality of stages.

18. The seat for a watercraft as set forth in claim 11, wherein the second cushion body is formed of a thermoplastic elastomer in which filamentous members of the thermoplastic elastomer of an isotropic gelled visco-elastic body are bound in a three-dimensional net form.

19. The seat for a watercraft as set forth in claim 11, further comprising a skin extending over an entire surface of the first cushion body and wrapping around edges of the bottom plate.

20. The seat for a watercraft as set forth in claim 11, wherein length and width dimensions of the bottom plate are greater than length and width dimensions of the second cushion body.

* * * * *